(No Model.) 2 Sheets—Sheet 1.
E. T. BLUNT.
APPARATUS FOR COMPRESSING ENSILAGE.
No. 318,595. Patented May 26, 1885.
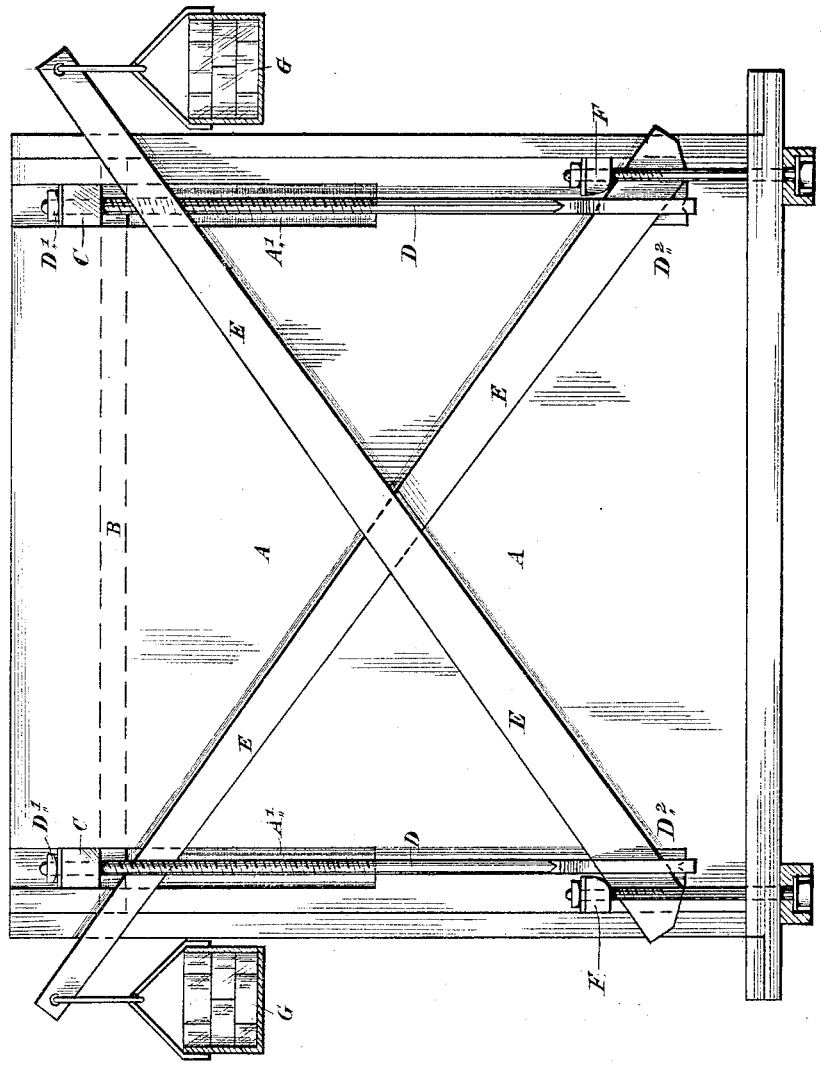

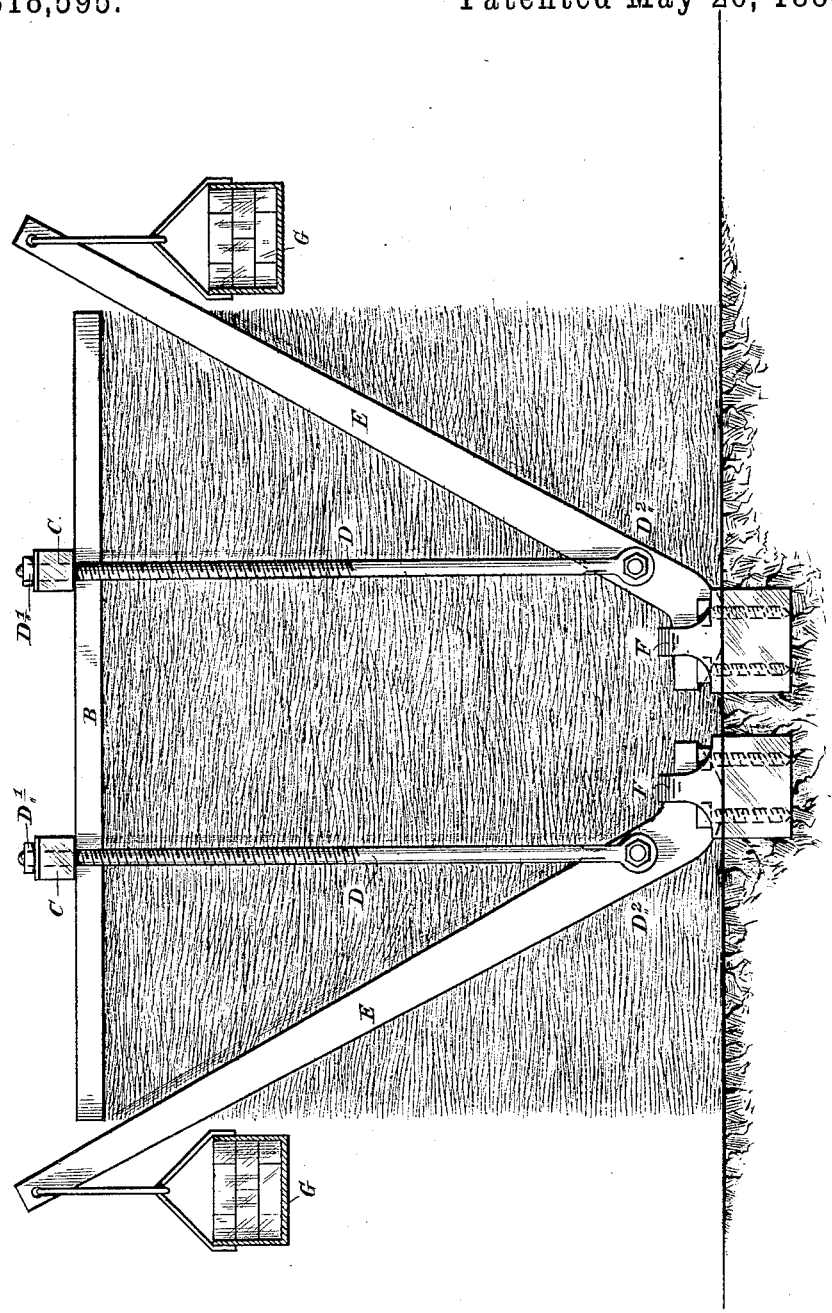

UNITED STATES PATENT OFFICE.

EDWARD THORNTON BLUNT, OF BLABY HILL, COUNTY OF LEICESTER, ENGLAND.

APPARATUS FOR COMPRESSING ENSILAGE.

SPECIFICATION forming part of Letters Patent No. 318,595, dated May 26, 1885.

Application filed April 1, 1885. (No model.)

*To all whom it may concern:*

Be it known that I, EDWARD THORNTON BLUNT, of Blaby Hill, in the county of Leicester, England, a subject of the Queen of England, have invented a new and useful Improvement in Apparatus for Compressing Ensilage, of which the following is a specification.

This invention will be best understood by reference to the accompanying drawings, in which Figure 1 is a side elevation of a chamber in which the ensilage is compressed, and Fig. 2 a like view of the apparatus as applied to a stack without any chamber or silo.

The ensilage to be compressed by this apparatus may be either in a silo or in a stack without a silo. If a silo is used, it may be as represented in the drawings by the box or chamber A, which forms in itself a complete silo or chamber in which the ensilage is to be compressed. As shown in the drawings, it is constructed entire, but as it is especially suitable for barns, granaries, and the like, some of the walls of the building may be utilized, so that the chamber A might consist of one, two, three, or four walls of its own, the remaining walls (if any) being those of the building in which it is placed.

To work the apparatus either upon a stack or in a silo, a lid, B, is provided which works freely upon the top of the ensilage. Upon it are placed cross-bars C, projecting beyond the sides of the silo or stack of ensilage, and through the ends of the bars pass the screw-rods D, jointed at their lower ends, $D^2$, to the lever E, or formed like a stirrup or hook for the levers to rest upon or in, as shown in Fig. 1. The short ends of E pass under the fixed supports F, or any other suitable fulcrum, such as a hole in the wall. The levers E each carry a weight, G, (or weight-box, which may be loaded as required,) at their ends, and the action of the whole is as follows: The lid B is placed in position on the top of the ensilage, the cross-bars C are placed upon the lid, projecting beyond the sides of the ensilage-stack, and where a silo is used projecting through the slots A' in the sides of the chamber A. The screw-rods D pass through holes in the bars C, and the nuts D' are screwed down until the ends of the levers E are raised sufficiently high, as shown in the drawings, for instance.

By reason of the great distance from $D^2$ to G, as compared with the very short distance from $D^2$ to F—that is, the length of the long arm of the lever being greatly in excess of that of the short arm—the weights G exercise very great pressure upon the lid B and the ensilage or contents of the chamber.

As the long ends of the levers E fall, in consequence of the ensilage being reduced in bulk, they can be restored to their original position, or raised as high as necessary, by screwing down the nuts D', so that the pressure is thus rendered continuous, as it is not necessary to remove the weights to do this, although of course the weights may be removed or the levers propped up while the nuts D' are screwed down, if that course be preferred.

In Fig. 1 the levers are crossed for convenience, each exercising pressure upon one end, and there is of course one pair to each side of the silo A, or ensilage-stack, so as to bring the lid B down evenly.

In the arrangement shown in Fig. 2 the bars C and rods D are brought nearer together, and the levers, instead of being crossed, as in Fig. 1, are fulcrumed near together, extending upward and outward, as shown. The action, however, is the same as in Fig. 1. This arrangement is convenient where small quantities of ensilage have to be pressed, as a single bar, C, and only two levers, E, and rods D are required, the bar C and rods D occupying a central position upon the stack or chamber.

The fulcrum F must be firmly secured by some suitable means, either in the ground or to beams passing underneath the chamber A or ensilage-stack.

Structural details may be modified—as, for instance, the cross-bars C may form part of or be secured to the lid B, provision being made for getting them into the slots A', or the exact construction and arrangement of the levers and fulcrum might be varied without departing from the spirit of my invention.

I claim—

1. In an apparatus for compressing ensilage, the combination, with a weighted lever, E, fulcrumed upon a fixed support, F, of a rod, D, or its mechanical equivalent, the length whereof is adjustable, substantially as and for the purpose specified.

2. In an apparatus for compressing ensilage, the combination of two weighted levers, E, connected by screw-rods D, with the lid B fulcrumed upon fixed supports F, and crossing each other approximately midway between said supports, substantially as specified, and shown in Fig. 1 of the accompanying drawings.

3. In an apparatus for compressing ensilage, the combination of two weighted levers, E, connected by screw-rods D, with the lid B, fulcrumed upon fixed supports F, located near together and extending in an upward and outward direction, substantially as specified, and shown in Fig. 2 of the accompanying drawings.

4. In an apparatus for compressing ensilage, the combination of four weighted levers, E, arranged in pairs, one pair in each side of the chamber or stack, each lever being independent of its fellows, but the whole adapted to act together upon the lid B, substantially as specified.

In testimony whereof I have hereto set my hand in the presence of two subscribing witnesses.

EDWARD THORNTON BLUNT.

Witnesses:
BERNHARD DUKES,
T. E. PONTIFEX.